(12) United States Patent
Lagger et al.

(10) Patent No.: US 11,931,839 B2
(45) Date of Patent: Mar. 19, 2024

(54) TRANSFER MACHINE

(71) Applicant: MIKRON SA AGNO, Agno (CH)

(72) Inventors: Luciano Lagger, Montagnola (CH); Luca Giacobazzi, Cassano Valcuvia (IT)

(73) Assignee: MIKRON SA AGNO, Agno (CH)

( * ) Notice: Subject to any disclaimer, the term of this patent is extended or adjusted under 35 U.S.C. 154(b) by 879 days.

(21) Appl. No.: 16/957,521

(22) PCT Filed: Feb. 13, 2018

(86) PCT No.: PCT/IB2018/050878
§ 371 (c)(1),
(2) Date: Jun. 24, 2020

(87) PCT Pub. No.: WO2019/158965
PCT Pub. Date: Aug. 22, 2019

(65) Prior Publication Data
US 2021/0053166 A1    Feb. 25, 2021

(51) Int. Cl.
*B23Q 1/26* (2006.01)
*B23Q 3/06* (2006.01)
(Continued)

(52) U.S. Cl.
CPC ............ *B23Q 1/26* (2013.01); *B23Q 3/06* (2013.01); *B23Q 7/02* (2013.01); *B23Q 16/02* (2013.01); *B23Q 2703/02* (2013.01)

(58) Field of Classification Search
CPC ... B23Q 1/26; B23Q 3/06; B23Q 7/02; B23Q 16/02; B23Q 2703/02
See application file for complete search history.

(56) References Cited

U.S. PATENT DOCUMENTS 2,965,208 A    12/1960  Forster et al.
3,688,363 A     9/1972  Eivind
(Continued)

FOREIGN PATENT DOCUMENTS

CN    203956637 U    11/2014
WO    2017182839 A1  10/2017

OTHER PUBLICATIONS

CN Office Action dated Dec. 23, 2021 re: Application No. 2018800848820, pp. 1-12, citing: U.S. Pat. No. 9248546 B1, U.S. Pat. No. 2965208 A, U.S. Pat. No. 3688363 A, U.S. Pat. No. 5815902 A and CN 203956637 U.

(Continued)

*Primary Examiner* — Saul Rodriguez
*Assistant Examiner* — Brendan P Tighe
(74) *Attorney, Agent, or Firm* — CANTOR COLBURN LLP

(57) ABSTRACT

A transfer machine:
includes a frame,
a table which is supported on the frame and can rotate with respect to the frame about a main vertical axis,
and work holding assemblies mounted on the table. Each work holding assembly has at least one collet assembly for retaining a workpiece being machined. The collet assembly is able to rotate with respect to the table about a vertical workpiece rotation axis.
The transfer machine includes at least one actuation motor in order to actuate rotationally the collet assembly and is provided with a driving shaft which can rotate about a respective driving axis.
At least one transmission assembly can be activated selectively and is configured to transmit motion from the driving shaft to the collet assembly.

(Continued)

At least one actuation motor is integral with the frame of the machine, with the respective driving shaft arranged horizontally.

7 Claims, 12 Drawing Sheets

(51) Int. Cl.
 *B23Q 7/02* (2006.01)
 *B23Q 16/02* (2006.01)

(56) References Cited

U.S. PATENT DOCUMENTS

| | | | | |
|---|---|---|---|---|
| 4,667,789 | A | * | 5/1987 | Cucchi .................... B23B 13/00 |
| | | | | 192/48.91 |
| 5,009,296 | A | * | 4/1991 | Ohkawa ............... B60N 2/0296 |
| | | | | 192/48.91 |
| 5,815,902 | A | | 10/1998 | Ottobeurer |
| 9,248,546 | B1 | | 2/2016 | Wern |

OTHER PUBLICATIONS

International Search Report dated Jan. 7, 2019 re: Application No. PCT/IB2018/050878, pp. 1-3, citing: US 2 965 208 A, WO 2017/182839 A1 and US 9 248 546 B1.
Written Opinion dated Jan. 7, 2019 re: Application No. PCT/IB2018/050878, pp. 1-5, citing: US 2 965 208 A, WO 2017/182839 A1 and US 9 248 546 B1.

\* cited by examiner

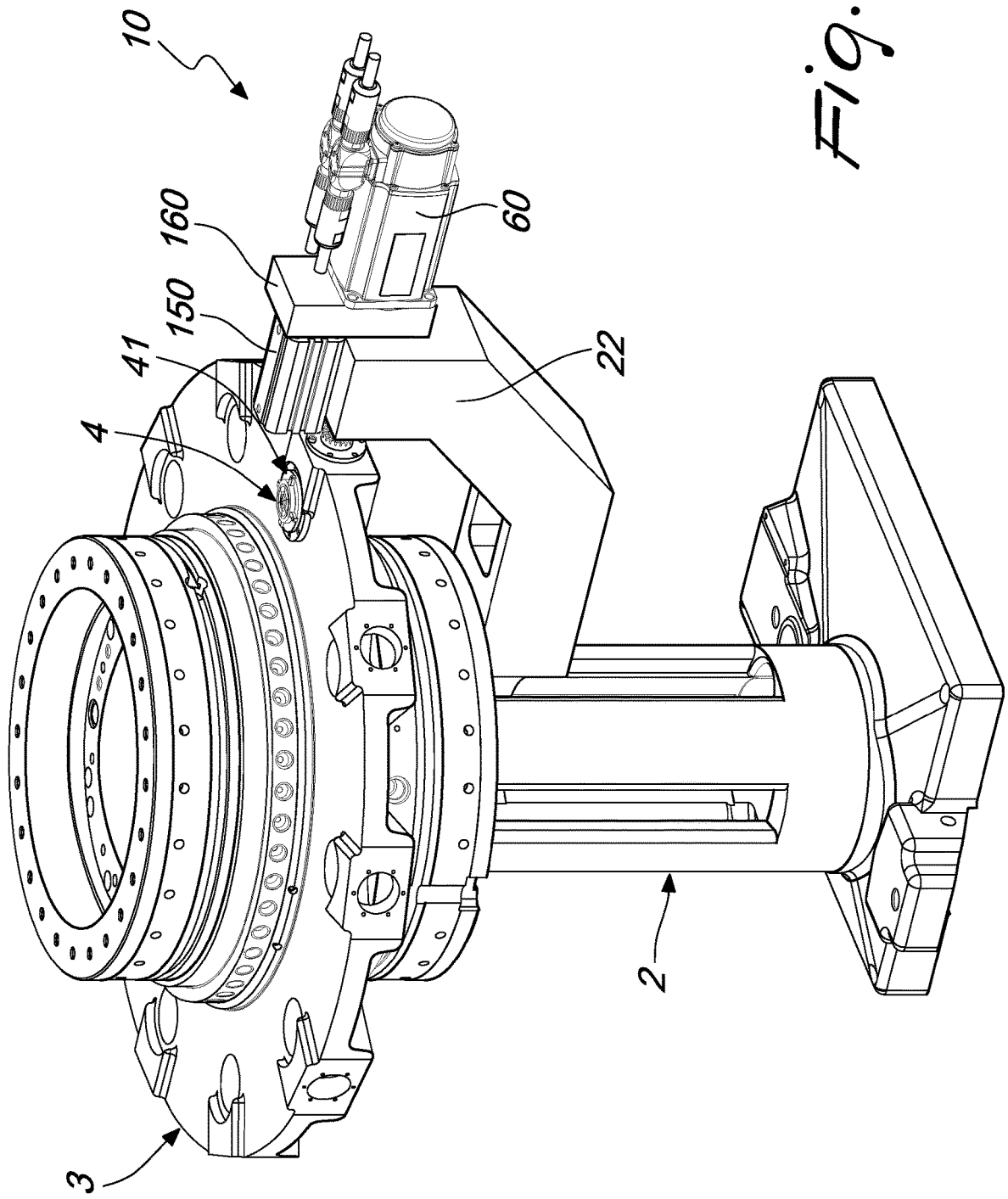

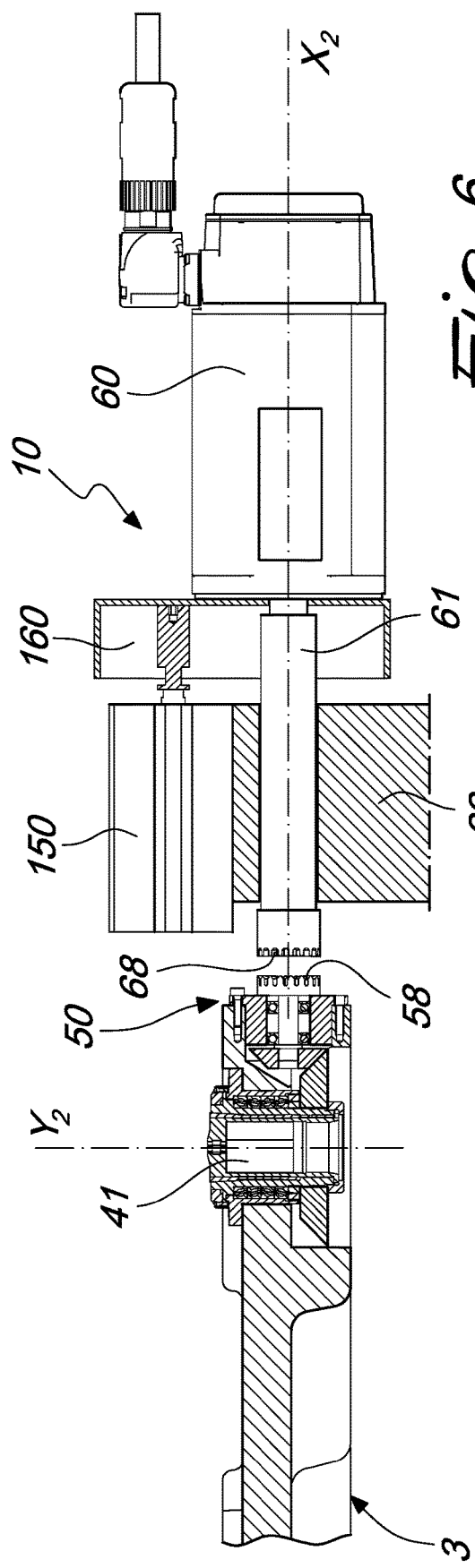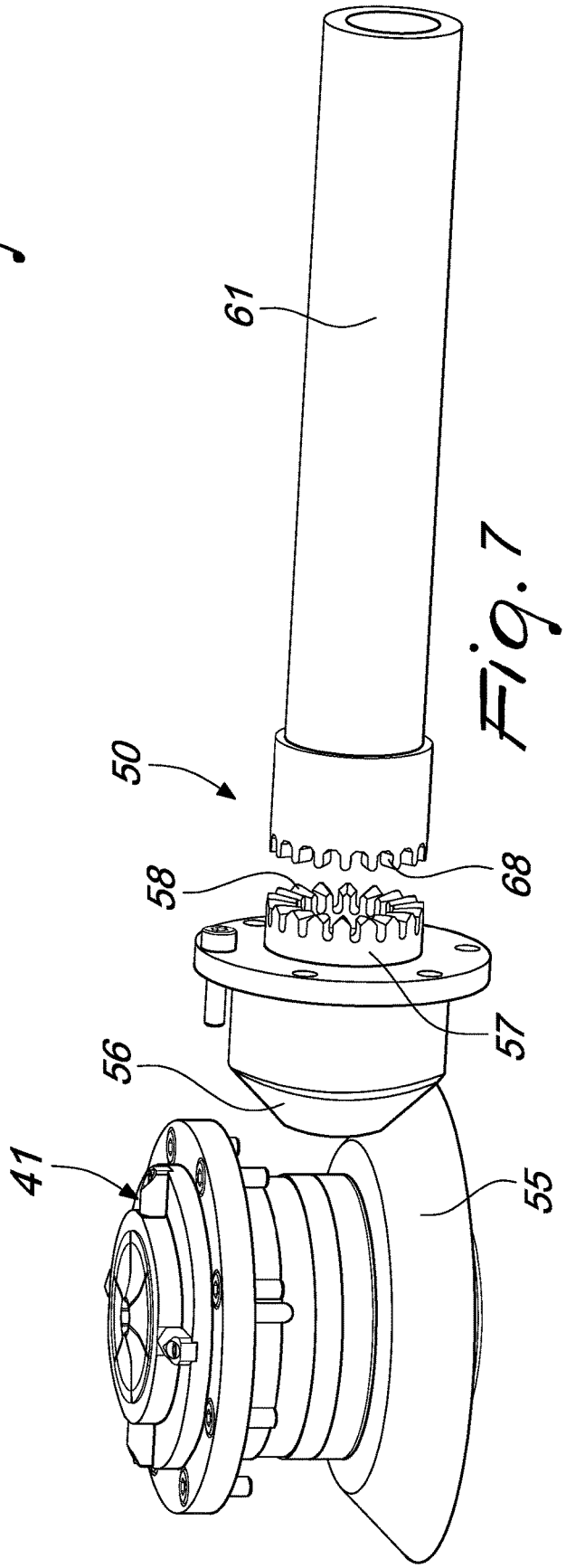

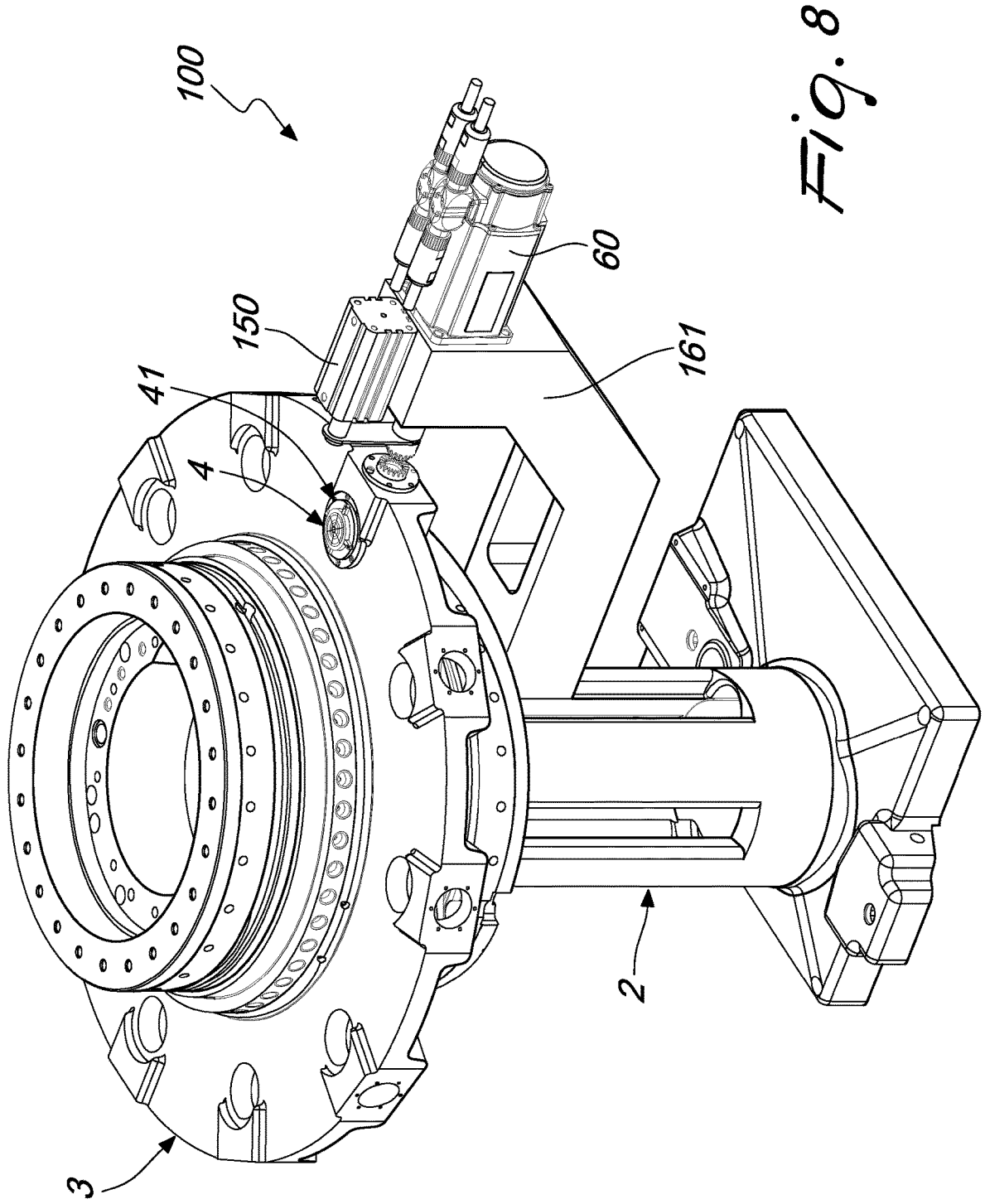

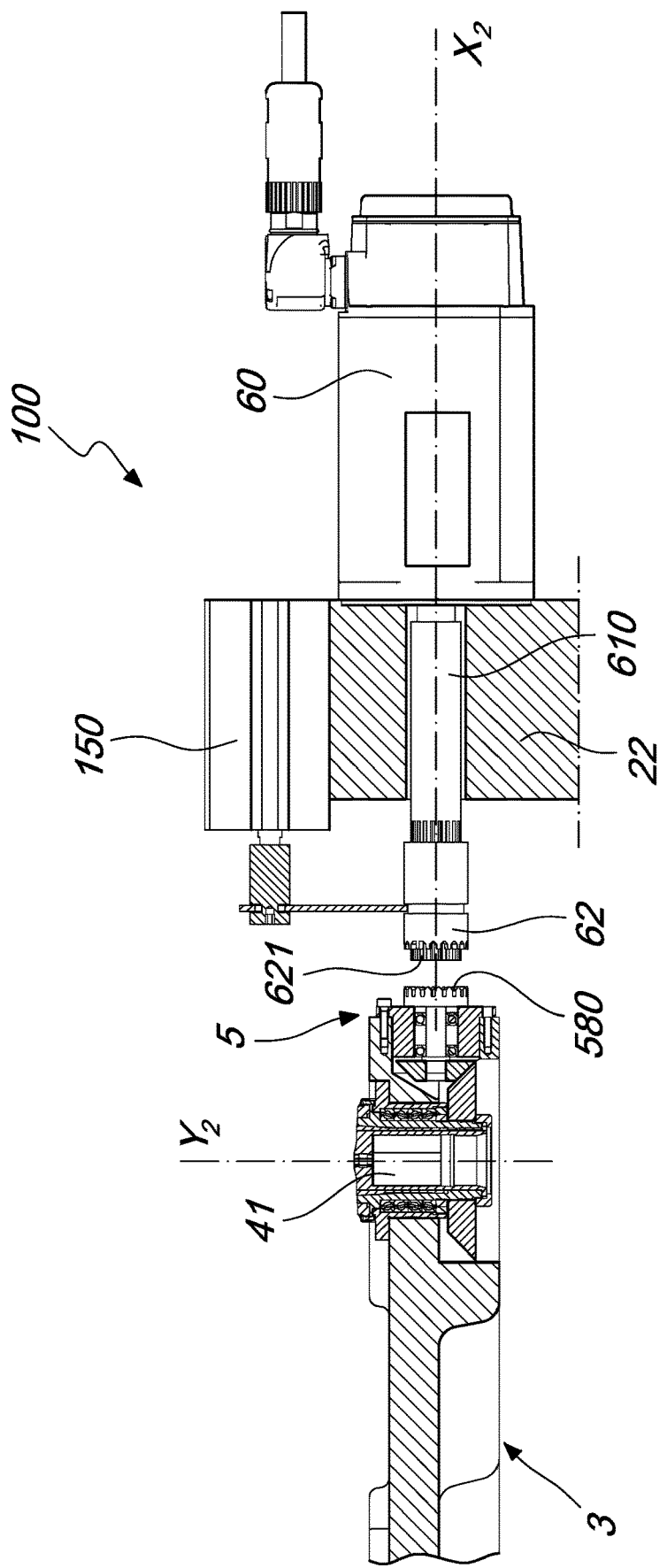

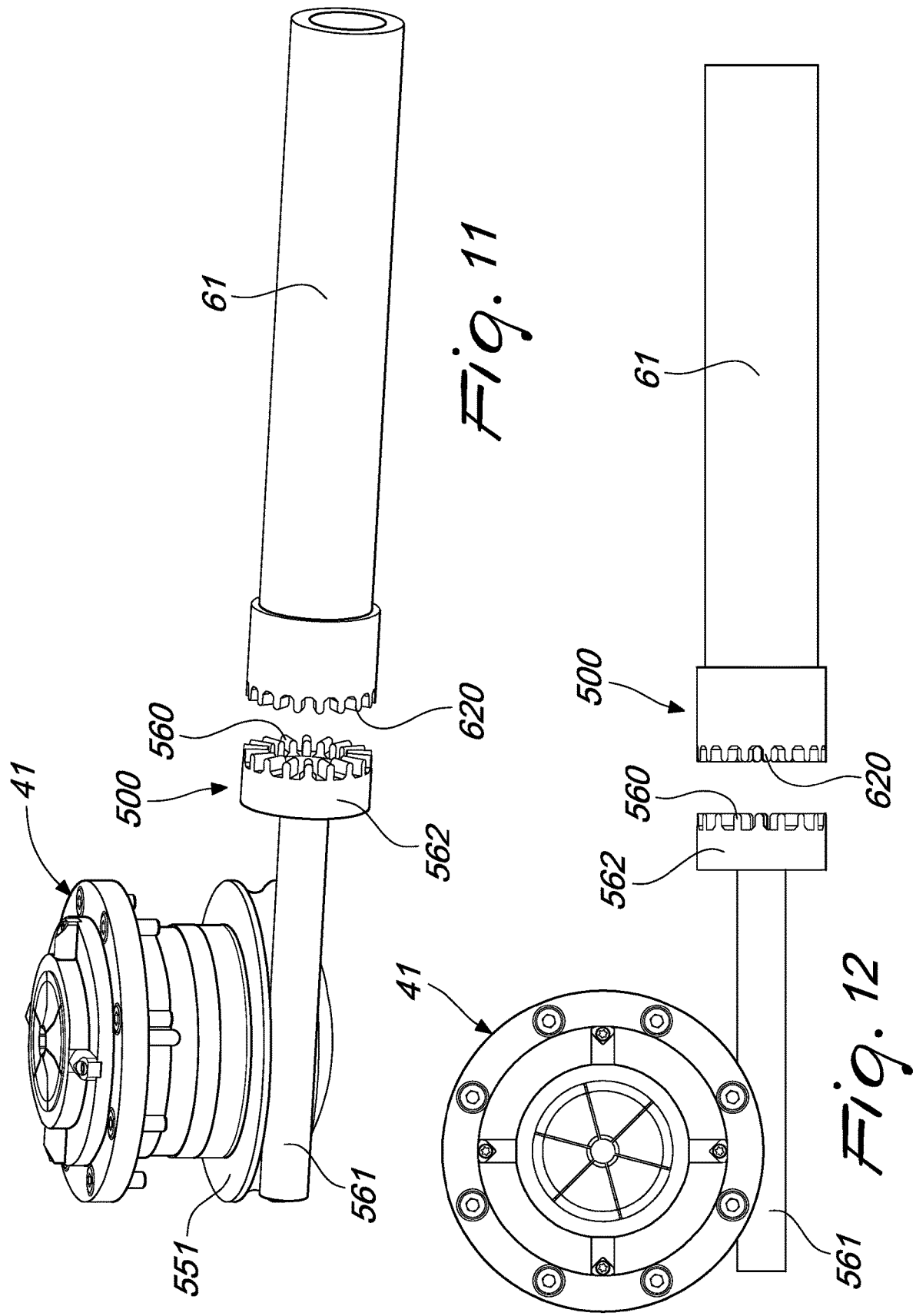

TRANSFER MACHINE

TECHNICAL FIELD

The present disclosure relates to a machine tool, in particular to a so-called transfer machine.

The machine to which reference is made is a machine provided with a footing on which a revolving table is mounted so that it can rotate about a vertical axis Y1; a certain number of work holding assemblies, arranged at a radial distance from Y1, is mounted on the table.

The collets comprise a work holding collet assembly which can rotate about its own axis Y2 (which is parallel to Y1) in order to turn the workpiece when the machinings require it (e.g., for positioning or for milling).

BACKGROUND

Machining stations, each provided with one or more machining heads, are mounted radially (with respect to Y1) around the table.

The workpieces being machined therefore pass from one machining station to another by means of a rotation of the table; the stations also are usually fixed to the footing or frame of the machine.

Over the course of time, solutions adapted to avoid mounting the actuation motors of the collet assemblies directly on the table have been developed.

A solution of this type is shown in application WO2017/182839: here, the motor for turning the collet assembly is mounted on the footing (or frame) of the machine (therefore does not rotate with the table) in a certain angular position that corresponds to a machining station; there is also a transmission assembly which can be coupled/uncoupled selectively with respect to the collet assembly in order to rotate it.

Specifically, the motor is mounted with a vertical driving shaft and the transmission assembly comprises a vertically movable transmission shaft, which is aligned with the driving shaft and is functionally connected thereto, and a flanged connection.

Although functional, this solution has limitations, linked mainly to the fact that the motor is mounted inside the work radius: this forces the use of small and lightweight motors in order to avoid increasing unduly the space occupation of the frame in the part inside the work radius.

It should be noted, by the way, that the dimensions of the motor affect directly the power and cost of the latter, since smaller motors are normally less powerful and/or more expensive due to component miniaturization.

Furthermore, maintenance interventions on these motors with vertical shaft mounted within the work radius of the machine are particularly awkward, since the table and the machining stations interfere with access to the motor itself, as they are located further outward.

Also, in the known configuration with a motor with vertical shaft arranged within the work radius, the tables must have a large diameter, with a negative consequence in terms of greater weight to be moved, which entails that the main motor of the machine (adapted to turn the table) also must be oversized with respect to tables that have a reduced diameter and a consequent lower weight.

Another limitation of tables with a large diameter resides in thermal deformation, which is directly proportional to the diameter itself and therefore is (in absolute value) greater in tables that have a large diameter.

Finally, the mounting of a motor with vertical shaft forces to increase the height of the machines thus provided, and this might entail installation problems if the ceiling has a limited height.

SUMMARY

The aim of the present disclosure is to provide a machine of the type cited above which solves the technical problem described above, obviates the drawbacks and overcomes the limitations of the background art, allowing to have available a solution that allows the mounting of motors of any size and power without the dimensions and/or space occupations of the table being affected.

Within the scope of this aim, the present disclosure provides a machine that is less sensitive to dirt and/or fragments produced by machining Within the scope of this aim, the present disclosure also provides an alternative to known solutions.

Within the scope of this aim, the present disclosure further provides a machine with facilitated maintenance.

This aim, these advantages and others which will become better apparent hereinafter are achieved by providing a transfer machine comprising:

a frame, a table which is supported on the frame and can rotate with respect to the frame about a main vertical axis, a plurality of work holding assemblies mounted on the table, each work holding assembly being provided with at least one collet assembly for retaining a workpiece being machined, said collet assembly being able to rotate with respect to the table about a vertical workpiece rotation axis, at least one actuation motor in order to actuate rotationally said collet assembly and provided with a driving shaft which can rotate about a respective driving axis, at least one transmission assembly, which can be activated selectively and is configured to transmit motion from said driving shaft to said collet assembly, characterized in that said at least one actuation motor is integral with the frame of the machine, with the respective driving shaft arranged horizontally.

BRIEF DESCRIPTION OF THE DRAWINGS

Further characteristics and advantages will become better apparent from the description of a preferred but not exclusive embodiment of a transfer machine, illustrated by way of nonlimiting example with the aid of the accompanying drawings, wherein:

FIG. 5 is a perspective view of part of a second embodiment of a machine according to the disclosure;

FIG. 6 is a sectional side view of a detail of FIG. 5;

FIG. 7 is a perspective view of the detail of a transmission assembly of the machine of FIG. 5;

FIG. 8 is a perspective view of part of a third embodiment of a machine according to the disclosure;

FIG. 9 is a lateral sectional view of a detail of FIG. 8;

FIG. 11 is a perspective view of a possible alternative embodiment of the transmission assembly of a machine according to the disclosure;

FIG. 12 is a top plan view of FIG. 11;

DETAILED DESCRIPTION OF THE DRAWINGS

Figure 1:
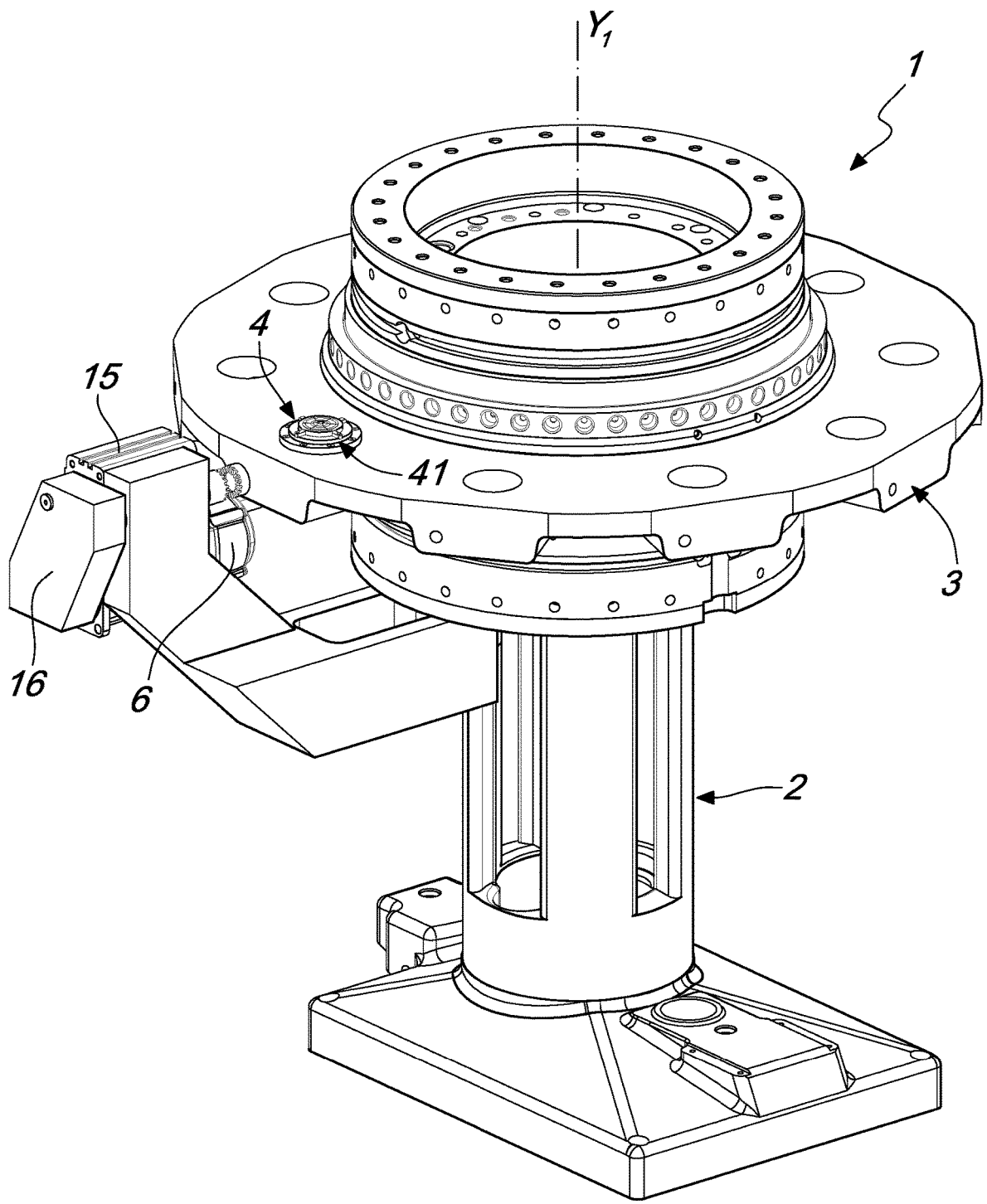
FIG. 1 is a perspective view of part of a first embodiment of a machine according to the disclosure.

Before delving into the detailed description, it should be noted that the accompanying figures show parts of a machine tool according to the disclosure which, for the sake of clarity, have some parts removed (e.g., radial peripheral machining stations) since these parts, in addition to being known by the person skilled in the art, are not useful for the comprehension of the disclosure itself and would only contribute to an overall crowding of the figures.

With reference to the cited figures, the improved transfer machine, designated generally by the reference numerals 1, 10, 100, depending on the embodiment, comprises a frame 2 and a table 3 which is supported on said frame 2 and can rotate with respect to it about a main vertical axis Y1.

Multiple mutually angularly spaced work holding assemblies 4 are mounted on the table 3; preferably, the work holding assemblies 4 are all extended on the same circumference.

Each work holding assembly 4 is provided at least with one collet assembly 41 for retaining a workpiece being machined; the collet assembly 41 can rotate with respect to the table 3 about a vertical workpiece rotation axis Y2, so as to rotate the workpiece for the corresponding machining or positioning maneuvers.

In the illustrated examples, the table 3 is substantially circular and the work holding assemblies 4 are distributed uniformly along the circumference of the table 3.

In other embodiments, the table 3 can have different shapes, such as for example a polygonal or lobate shape, with the work holding assemblies 4 arranged according to the specific machining requirements.

The machine 1, 10, 100 furthermore comprises at least one actuation motor 6, 60 for rotating the collet assembly 41 and provided with a driving shaft 61, 610 which can rotate about a respective driving axis.

In some embodiments the machine 1 comprises an actuation motor 6, 60 which actuates a dedicated collet assembly 41; in other embodiments, the machine comprises a plurality of actuation motors 6, 60 which actuate a plurality of collet assemblies 41; in some embodiments there are also collet assemblies which are not motorized or a motorized in a different manner; in still other embodiments there is an actuation motor which is common to multiple collet assemblies 41.

For the sake of simplicity, hereinafter reference will be made to the preferred and illustrated embodiments, in which a motor 6, 60 turn a collet assembly 41.

In common to the various embodiments, the machine also comprises at least one selectively activatable transmission assembly 5, 50, 500 which is configured to transmit motion from the driving shaft 61, 610 of the motor 6, 60 to the collet assembly 41.

According to the disclosure, said at least one actuation motor 6, 60 is integral with the frame 2 of the machine 1, 10, 100 with the respective driving shaft 61, 610 arranged horizontally (and therefore at right angles to the main vertical axis Y1).

In the preferred and illustrated embodiments, the collet assemblies 41 define a work radius R of the machine 1, 10, 100 and the actuation motor 6, 60 is mounted externally to said work radius R.

Figure 4:
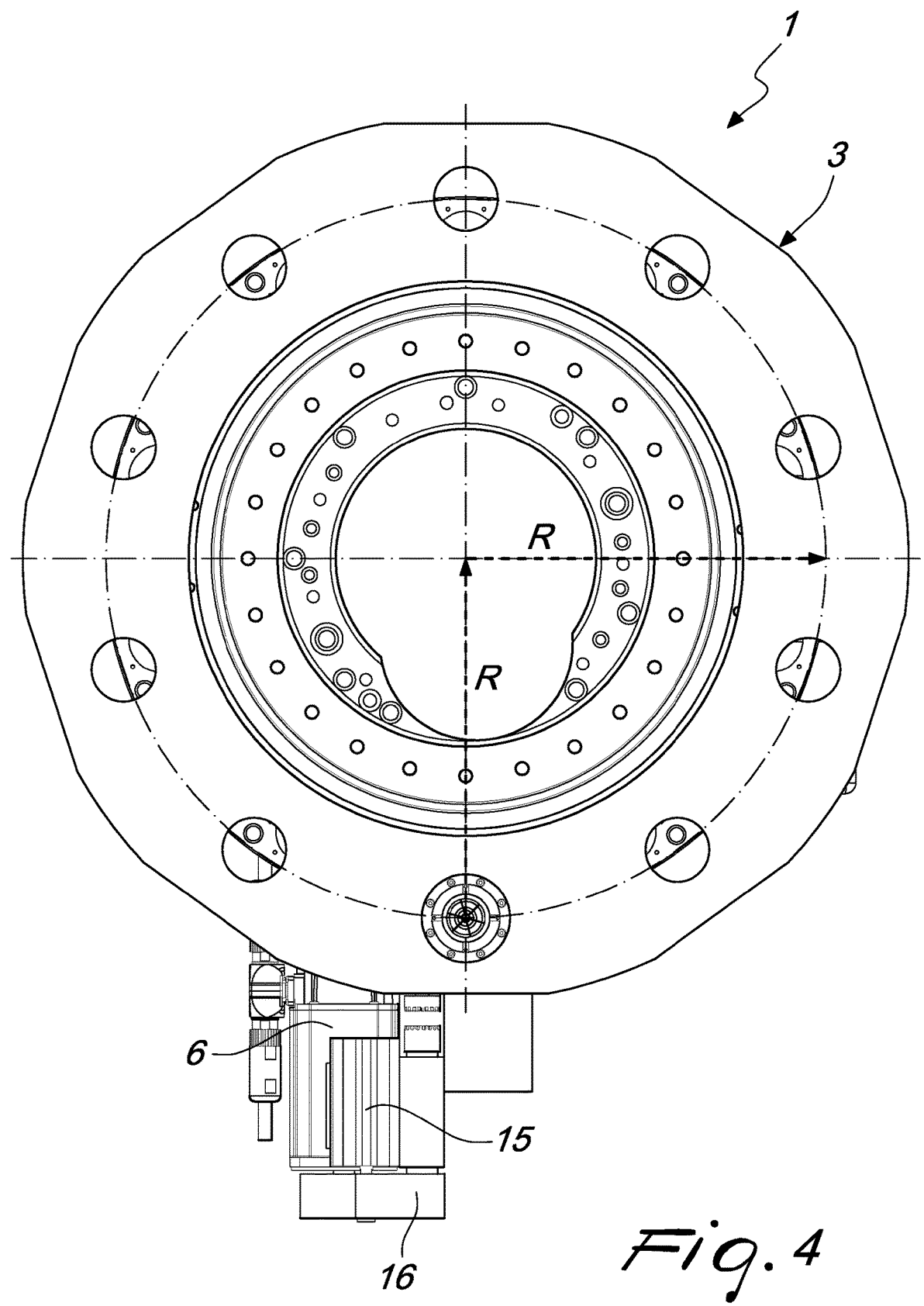
FIG. 4 is a top plan view of the machine part of FIG. 1.

In other words, as shown in FIG. 4, the collet assemblies 41 are preferably all arranged at a same distance R from the main vertical axis Y1, being therefore arranged along a circumference with a radius equal to said distance R, and the motor 6, 60 is arranged outside said circumference (i.e., at a distance from the main vertical axis Y1 that is greater than R).

As can be understood by looking at the figures, this solution allows to free space around the collet assembly 41, especially toward the machine center, without having to increase the diameter of the table 3, even in the presence of actuation motors 6 that have a large space occupation.

Furthermore, the motor 6, 60, being outside the work radius and spaced from the collet assembly 41, is less exposed to shavings and machining liquids (e.g., lubricating-refrigerating liquids and the like).

The motor 6, 60 is fixed to a support 16, 160, 161 which in some embodiments (FIGS. 8 and 9) is coupled rigidly to the frame, in other embodiments (FIGS. 1 to 6) can be moved, with respect to the frame 2, along a rectilinear trajectory X2; these aspects will also be described hereinafter.

In greater detail, in the embodiments shown in FIGS. 1 to 6, the machine 1 or 10 comprises a support 16, 160 which is coupled so that it can move to the frame 2 and more precisely can move along a rectilinear trajectory X2.

With reference to these embodiments 1 or 10, the motor 6, 60 is integral with the support 16, 160, so that at least the motor 6, 60 and the driving shaft 61, 610 can be moved in a linear manner between a condition in which the transmission assembly 5, 50 is activated, in which the collet assembly 41 is functionally coupled to the driving shaft 6, 60, and a condition in which the transmission assembly 5, 50 is deactivated, in which the collet assembly 41 is functionally uncoupled from the driving shaft 6, 60.

In even greater detail, it is possible to recognize a first embodiment (FIGS. 1, 2, 3 and 4), in which the motor 6 is fixed internally with respect to the support 16 (i.e., on the part of the support 16 that is proximal with respect to the table 3), and a second embodiment (FIGS. 5 and 6), in which the motor 60 is fixed to the outside of the support 160 (distally with respect to the table 3).

In this second embodiment, as shown in FIG. 6, the support is provided with a perforated seat which is crossed by the driving shaft 610 and inside which the driving shaft 610 can rotate freely.

It should be noted that in this second embodiment, since the support 160 is interposed between the table 3 and the motor 60, the latter is more protected during machining against shavings and work liquids.

In both of these two embodiments, the machine 1, 10 comprises an actuator 15, 150 which is coupled to the frame 2 and to the movable support 16, 160 in order to actuate the rectilinear movement of the latter with respect to the frame 2.

Said actuator 15 can be, for example, a hydraulic actuator (e.g., a hydraulic cylinder) which comprises a body which is coupled to the frame and an expandable piston which is connected to the movable support 16, 160.

In the illustrated example, the actuator 150 is fixed on an aim 22, which in turn is fixed to the frame 2, the distal portion of which is interposed between the movable support 160 and the table 3. Said distal portion of the arm 22 is conveniently provided with a channel which is crossed by the driving shaft 610 and inside which the driving shaft 610 is free to rotate and slide longitudinally.

It should be noted that in both embodiments the movement trajectory X2 of the support 16 lies on a horizontal plane which is perpendicular to the main vertical axis Y1.

FIGS. 8 and 9 show a third embodiment in which the machine 100 comprises a support 161 which is coupled rigidly to the frame 2 and in which the driving shaft 61 and the transmission assembly 50 comprise a coupling which can be activated selectively in order to provide an activated transmission assembly condition, in which the collet assembly 41 is functionally coupled to the driving shaft 61, and a deactivated transmission assembly condition, in which the collet assembly 41 is functionally uncoupled from the driving shaft 61.

In the example shown in FIGS. 8 and 9, the support 161 in practice is constituted by an arm with the same characteristics already described for the arm 22 that is present in the second embodiment.

The manners in which the activated and deactivated transmission assembly conditions are provided will become better apparent from the description of some possible embodiments of the transmission assemblies 5, 50, 500.

FIGS. 6, 7 show in detail the transmission assembly 50 of the second embodiment of the machine 10, i.e., the one shown in FIG. 5, in which the support 16, 160 can be moved along a rectilinear trajectory.

Figure 10:
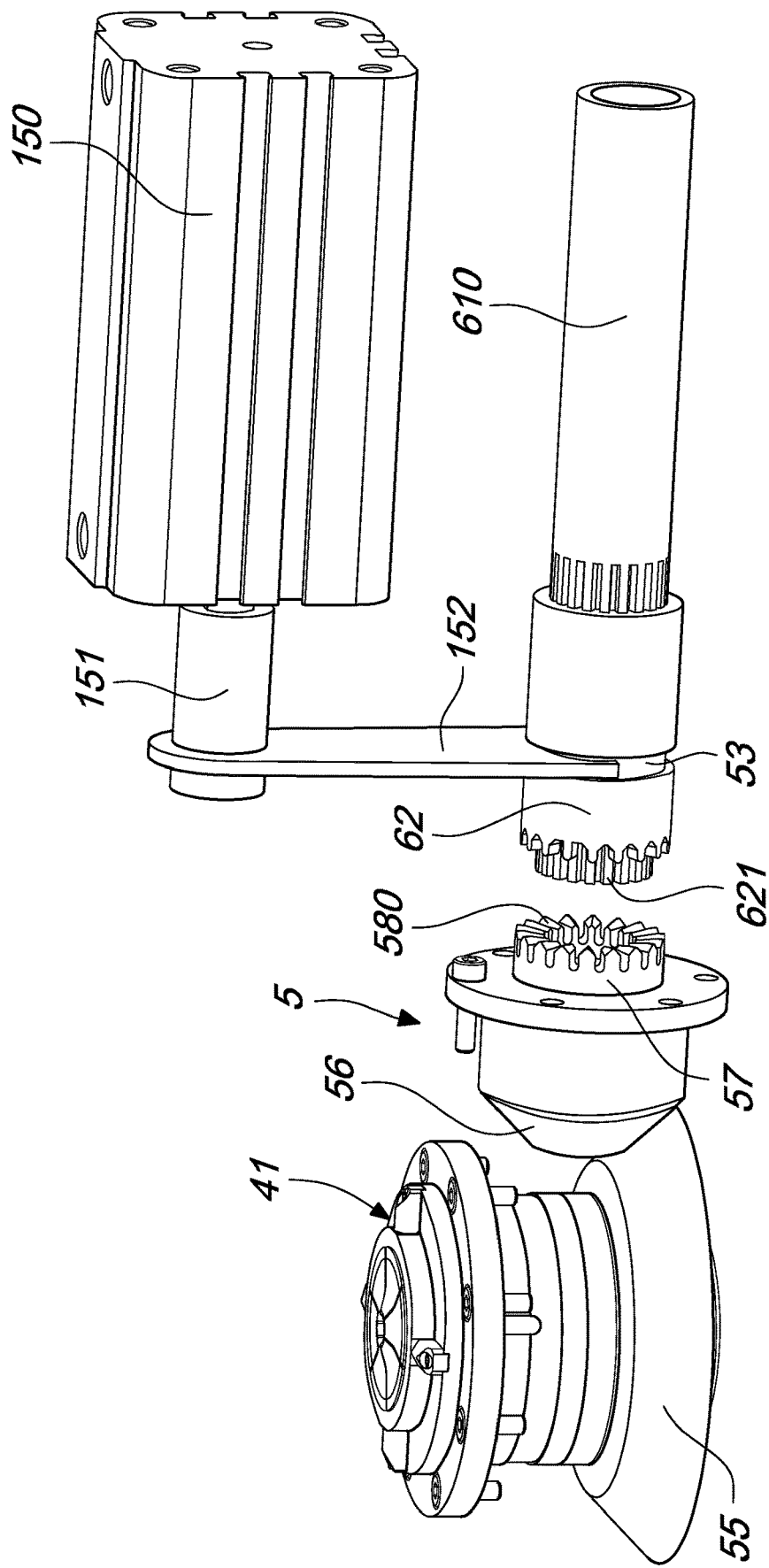
FIG. 10 is a perspective view of the detail of the transmission assembly of the machine of FIG. 8.

FIGS. 9 and 10 instead show the details related to the transmission assembly 5 of the third embodiment of the machine 100, i.e., the one shown in FIG. 8, in which the support 161 is coupled rigidly to the frame.

In both of these embodiments, the transmission assembly 5, 50 comprises a first bevel gear 55 with a vertical axis and a second bevel gear 56 with a horizontal axis, which mesh together.

In greater detail, the first gear 55 is integral with the collet assembly 41 and the second gear 56 is integral with an engagement shaft 57 which is coaxial to the driving shaft 61, 610 and is configured to be coupled to the latter.

The difference between the two embodiments resides in the mechanism with which the activated transmission assembly condition and the deactivated transmission assembly conditions are provided.

In the first example, shown in FIGS. 6 and 7, the engagement shaft 57 and the driving shaft 61 comprise facing toothed engagement ends 58, 68, which are configured to mesh in the activated transmission assembly condition; in these embodiments, the activated transmission assembly condition is provided by translating the motor 6, 60 and the driving shaft 61 that is integral therewith in the direction of the table 3 to the position in which the toothed end 68 of the driving shaft 61 meshes with the toothed end 58 of the engagement shaft 57, thus providing a continuous kinematic chain between the driving shaft 61 and the collet assembly 41 so as to provide the latter with rotational actuation.

Vice versa, the deactivated transmission assembly condition is obtained by translating the motor 6, 60 together with the driving shaft 61 in the opposite direction.

The translation of the driving shaft 61 and of the motor 6, 60 occurs preferably by moving the support 16, 160, to which the motor is integral, by means of the actuator 15, 150.

According to an optional and advantageous characteristics, the actuator 15 is configured to impart, in the activated transmission assembly condition, a preloading thrust to the driving shaft 61 so as to minimize, to the point of substantially eliminating, plays between the driving shaft 61 and the engagement shaft 57; this allows to improve the precision of the couplings and therefore the precision of the machining.

Figure 2:
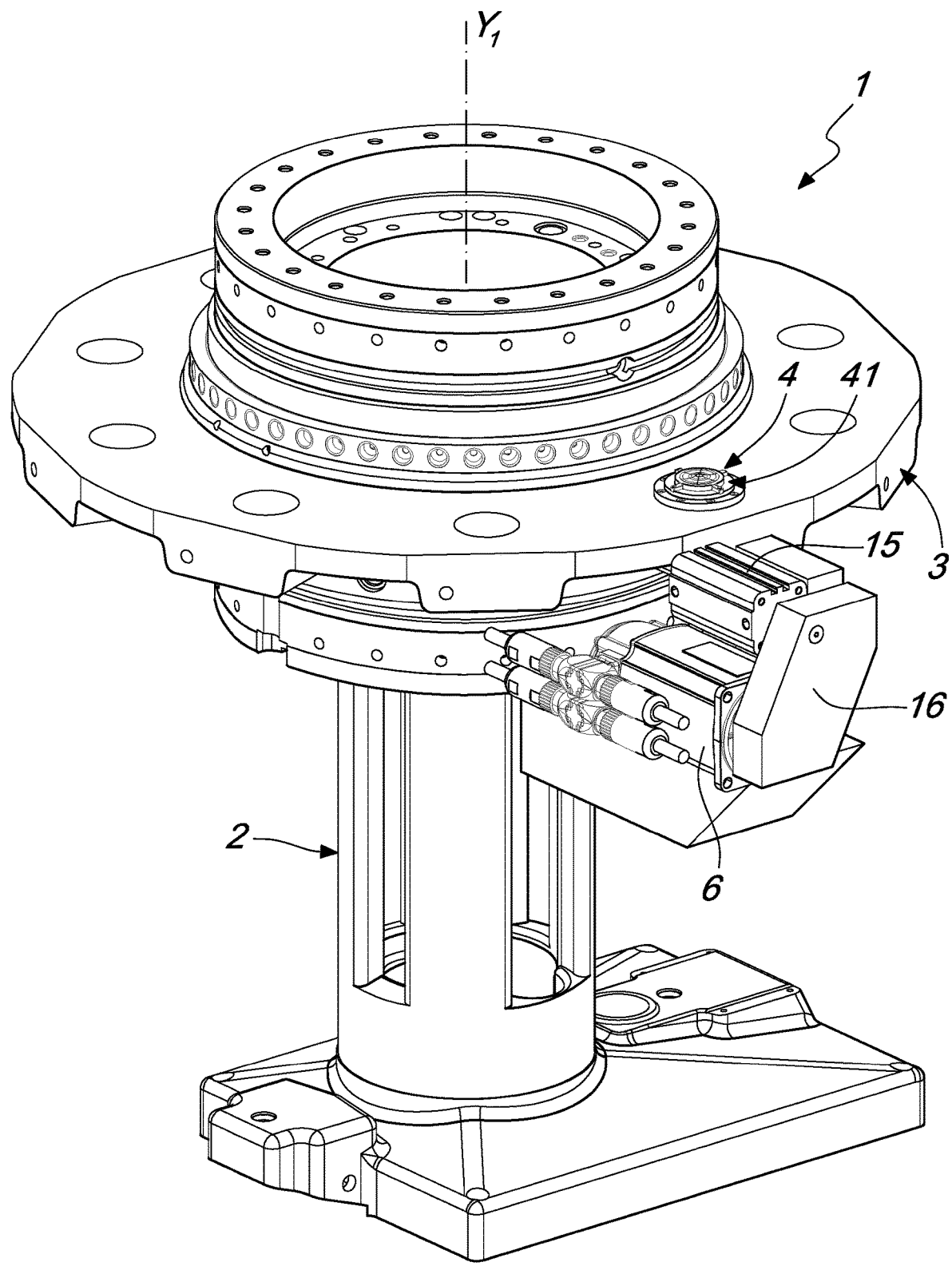
FIG. 2 is another perspective view of part of the first embodiment of the machine of FIG. 1.
Figure 3:
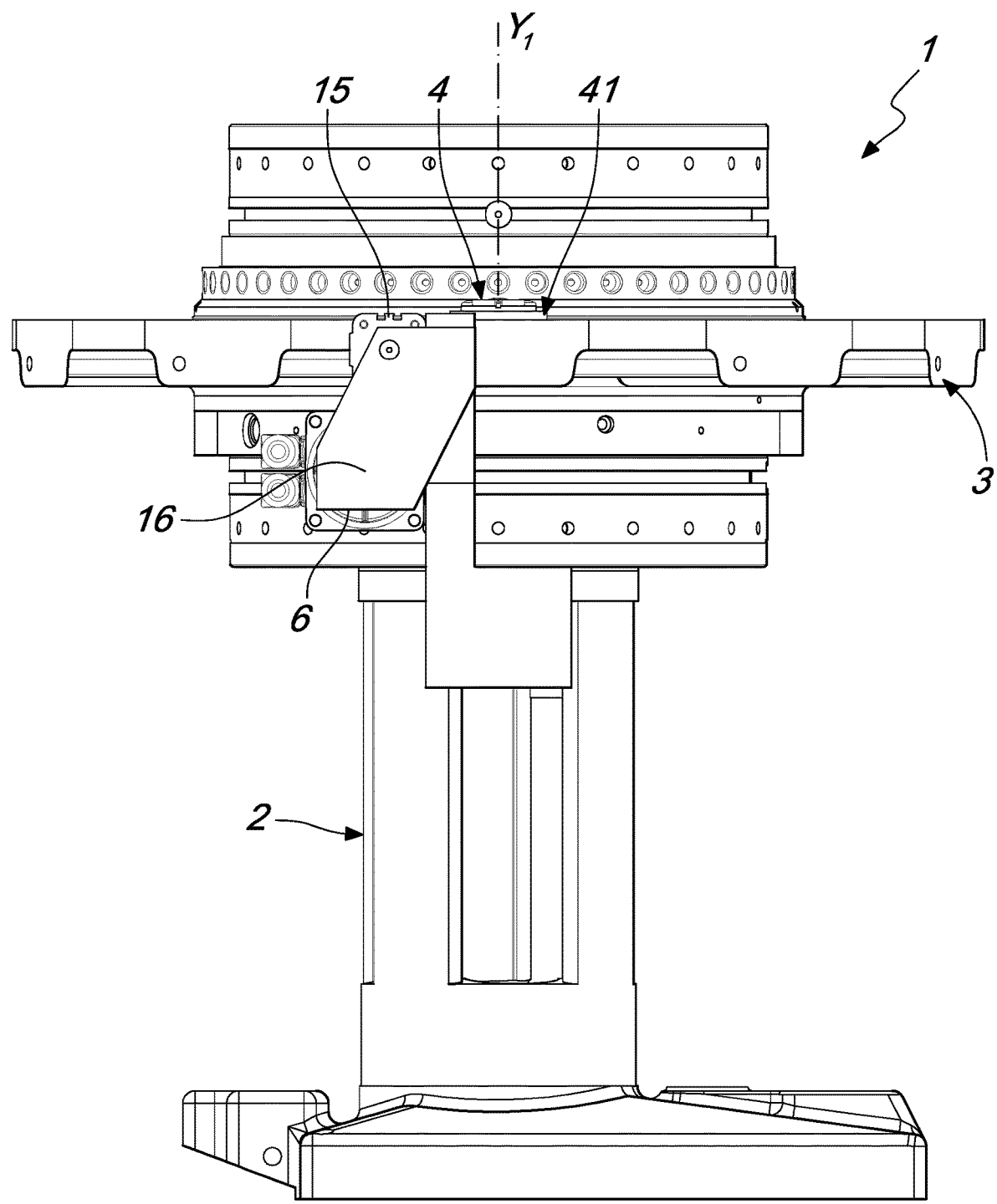
FIG. 3 is a lateral elevation view of the machine part of FIG. 1.

The solution that has just been described is used also in the first embodiment of the machine 1 shown in FIGS. 1 and 2.

In the second example shown in FIGS. 9 and 10, the engagement shaft 57 is provided with a free end 580 provided with engagement teeth, while the driving shaft 610 comprises a coupling sleeve 62, which rotates integrally with the driving shaft 61 and can be moved along the latter. In greater detail, the sleeve 62 is provided with a toothed engagement end 621 which faces the free end 580 of the engagement shaft 57 in order to mesh with it in the activated transmission assembly condition; for the rotational coupling between the sleeve 62 and the driving shaft 61 it is possible to provide, for example, grooves and radial teeth and or the like.

In practice, in this last embodiment, the motor 60 and the driving shaft 610 are fixed with respect to the frame 2 and the activated transmission assembly condition is provided by translating the sleeve 62 along the driving shaft 610, in the direction of the table 3, to the position in which the toothed engagement end 621 of the sleeve 62 meshes with the free end of the driving shaft 57, thus providing a continuous kinematic chain between the driving shaft 610 and the collet assembly 41.

The sleeve 62 is constituted for example by a substantially cylindrical body provided with a longitudinal cavity which is at least partly engaged by the driving shaft 610.

Advantageously, multiple longitudinal teeth are provided on the side wall of said cavity and engage in a corresponding number of longitudinal grooves provided on the outer wall of the driving shaft 610. In this manner the driving shaft 610 and the sleeve 62 are rotationally coupled (i.e., the rotation of the driving shaft 610 turns the sleeve 62) and at the same time the sleeve 62 is free to slide longitudinally along the driving shaft 610.

The translation of the sleeve 62 along the driving shaft 610 is provided preferably by means of an actuator 150 which is fixed to the same support 161 that supports the motor 60.

In greater detail, the actuator 150 is provided with an expandable piston 151, which moves along a rectilinear trajectory the sleeve 62 by means of a coupling bar 152.

The coupling bar 152 comprises a first end which is rigidly coupled to the piston 151 and a second end which engages an annular groove 63 provided on the external surface of the sleeve 62; the second end engages the annular groove 63 so as to not hinder the rotation of the sleeve 62.

Optionally, in a manner similar to what has been described above, the actuator 150 is configured to apply a preloading thrust to the sleeve 62 in the activated transmission assembly condition.

In other possible embodiments, not shown, the first bevel gear 55 with vertical axis, the second bevel gear 56 with horizontal axis and the engagement shaft 57 are replaced with one or more kinematic transmission elements of a different type, such as for example a gear-worm screw system.

For example, FIG. 11 shows the transmission assembly 500 of another possible embodiment. In this example, the transmission assembly 500 comprises a gear 551 and a worm screw 561, which are coupled in rotation to the collet assembly 41.

The worm screw 561 in turn is provided with a horizontal screw shaft 562, which is coaxial to the driving shaft 61 and is configured to be coupled to the latter.

In greater detail, the screw shaft 562 and the driving shaft 61 comprise facing toothed engagement ends 560, 620 which are configured to mesh in the activated transmission assembly condition.

In practice, in this last embodiment, the activated transmission assembly condition is provided by translating the motor 6, 60 and the driving shaft 61 that is integral therewith in the direction of the table 3 to the position in which the toothed end 620 of the driving shaft 61 meshes with the toothed end 560 of the screw shaft 562, thus providing a continuous kinematic chain between the driving shaft 61 and the collet assembly 41, in a manner similar to what has already been described for the first two embodiments of the machine 1, 10.

In yet another embodiment (not shown), the transmission assembly 500 comprises a gear 551 and a worm screw 561 which are rotationally coupled to the collet assembly 41 and a screw shaft 562 which is coaxial to the driving shaft 61; the screw shaft 562 is provided with a free end equipped with engagement teeth and the driving shaft 61 comprises a coupling sleeve, which rotates integrally with the driving shaft 61 and can be moved along it.

Said sleeve, exactly like the one of FIG. 10 already described, is provided with a toothed engagement end which faces the free end of the screw shaft in order to mesh together in the activated transmission assembly condition.

In practice, in this last embodiment, the motor 60 and the driving shaft are fixed with respect to the frame 2 and the activated transmission assembly condition is provided by translating the sleeve 62 along the driving shaft 61, in the direction of the table 3, to the position in which the toothed engagement end 621 of the sleeve 62 meshes with the free end of the engagement shaft 57, thus providing a continuous kinematic chain between the driving shaft 61 and the collet assembly 41, in a manner similar to what has already been described for the third embodiment of the machine 100 of FIG. 8.

Figure 13:
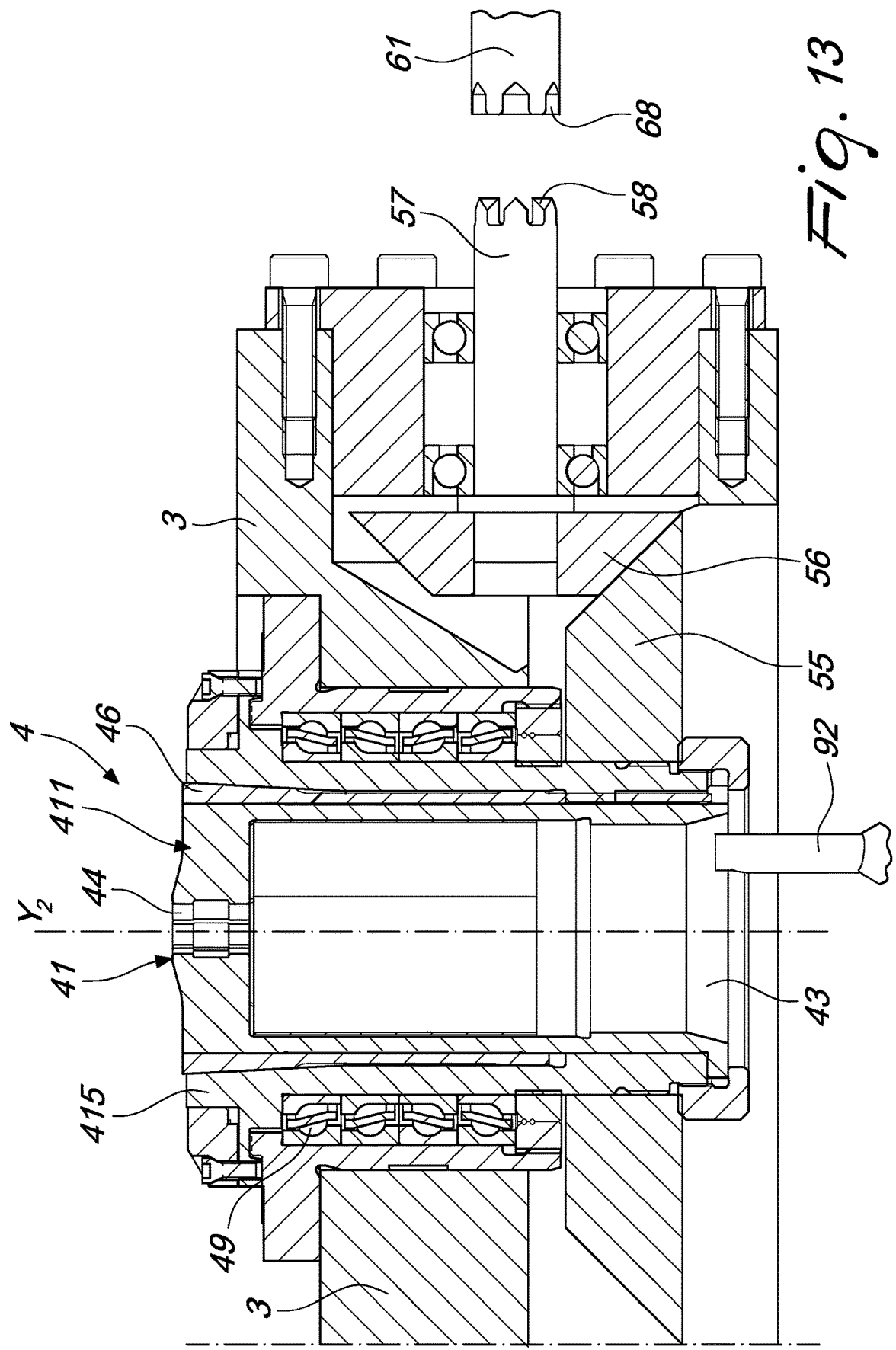
FIG. 13 is a sectional side view of a possible embodiment of the collet assembly of a machine according to the disclosure.

FIG. 13 shows a preferred embodiment of the collet assembly 41; in this embodiment, the collet assembly 41 comprises a hollow body 411, which is preferably cylindrical, and an external shaft 415, which is also hollow, is coaxial to the hollow body 411 and is functionally coupled to the transmission assembly 5, 50.

Even more preferably, the external shaft 415 has a cylindrical shape and is open at both longitudinal ends like a tube.

Again with reference to the example shown in FIG. 13, the hollow body 411 (generally termed work holding collet) is locked in the cavity of the external shaft 415 so as to rotate integrally therewith.

In practice, the external shaft 415 is rigidly coupled to the hollow body 411 so as to rotate it about the vertical workpiece rotation axis Y2.

The hollow body 411 is provided with an access opening 43 for a tool 92 and with elements 44 for retaining the workpiece being machined.

In other words, a cavity that can be accessed by the tool 92 through said opening 43 is advantageously formed between the retention elements 44 and the opening 43; it should be noted that in this manner the part being machined is accessible for machining from both sides, from above and from below.

In even greater detail, the retention elements 44 are constituted for example by contoured and appropriately machined edges of a through hole (preferably a ground cylindrical hole) which is provided on the end face of the hollow body 41 and more precisely on the end face that lies opposite the opening 43. These edges, by moving mutually closer, reduce the aperture of the through hole, tightening around the workpiece being machined.

The mutual radial movement of the retention elements is preferably made possible by the fact that the hollow body 41 is divided longitudinally into movable circular sectors which in practice constitute a plurality of claws or jaws.

The movement of these circular sectors is induced by one or more wedges 46 which are arranged between the internal wall of the external shaft shaft 45 and the external wall of the hollow body 41.

Preferably, there is a single wedge 46 which is constituted by a tubular body with a substantially frustum-like external shape and is provided with an axial through cavity inside which the hollow body 411 can be accommodated.

In practice, by inserting the wedge (or the wedges) 46 in the space between the hollow body 41 and the external shaft 45, the circular sectors of the hollow body 411 are pushed radially closer, reducing the aperture of the through hole and clamping the retention elements 44 around the workpiece.

In other embodiments, the retention elements 44 are provided with adapted grip elements, such as for example metallic or plastic plates, teeth, clamps, etc.

In the illustrated example, the work holding assembly 4 also comprises a plurality of bearings 49, such as for example ball bearings, which surround the collet assembly 41, facilitating its correct rotation.

Preferably, the transfer machine 1 furthermore comprises at least one machining station (not shown) which is supported by the frame and is provided at least with one working head functionally connected to a tool; the machining station comprises—in a fully general manner—the tool and the means required to move/actuate it (e.g., drive unit).

In some preferred solutions, the machining station comprises three working heads: an upper head arranged at a higher level than the table, a lower head arranged at a lower level than the table, and an intermediate head arranged substantially at a level that is intermediate between the two, so as to be able to perform machinings of the workpiece from three directions if required.

In this preferred embodiment, the actuation motor is preferably arranged at a lower level than the lower head.

At this point it is useful to specify that the term tool used up to now is understood to reference in a fully general manner any implement that is useful to perform machinings on a workpiece.

Preferably, these tools comprise implements for mechanical machining, particularly by chip forming, such as for example cutters, bits, cutting or shaping taps, rolling tools, broaching tools, punches, different turning tools, etc.

However, embodiments are also possible in which the tools used are of another type, such as for example laser emission heads or pressurized fluid emission heads.

According to an optional and advantageous characteristic, the machine 1, 10, 100 also comprises an indexing device 7 which acts between the collet assembly 41 and the table 3 and is configured to provide an indexing of the collet assembly 41, i.e., the radial placement of the collet in a preset position, so as to orient the workpiece in an appropriate and repeatable manner.

Preferably, an indexing device is present for each collet assembly 41.

The term "indexing" is understood to reference the unique determination of the placement in a given angular position.

In practice, the indexing device allows to fix the collet assembly 40 (and therefore the workpiece with it) with a given orientation, locking the rotation of the collet assembly 41 and thus keeping the workpiece stationary in this position.

In this way precision machinings are possible in an automated manner.

Figure 14:
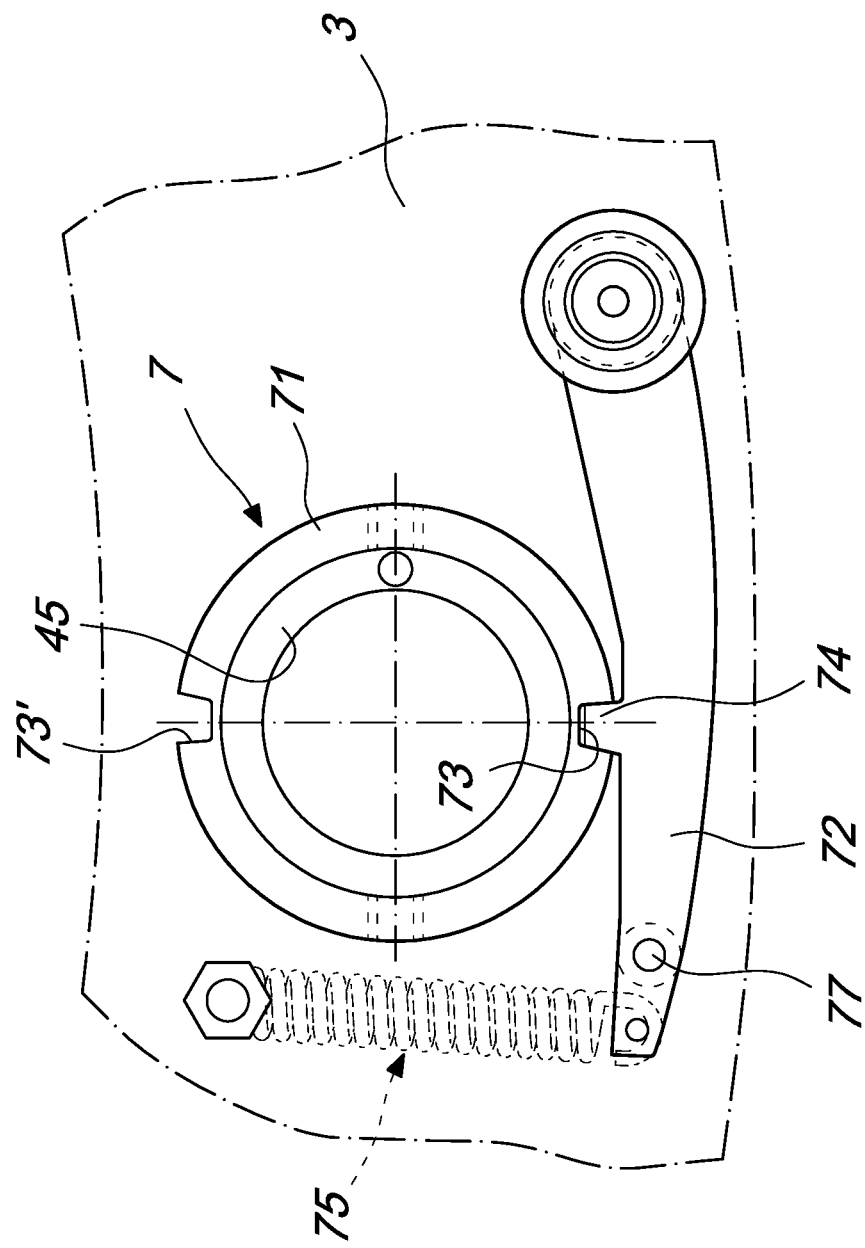
FIG. 14 is a top plan view of a possible embodiment of the indexing device of a machine according to the disclosure.

One of the possible embodiments of the indexing device is shown in FIG. 14.

In the illustrated example, the indexing device 7 comprises an annular body 71 which is coupled rigidly to the external shaft 45 of the collet assembly 41 and is preferably keyed to the outside thereof, so as to rotate integrally therewith about the same workpiece rotation axis Y2.

The annular body 71 is provided, along its external wall, with one or more perimetric reference hollows 73, 73'.

The preferred and illustrated indexing device 7 furthermore comprises a locking arm 72 which can oscillate and is provided with at least one pivot 74 which is configured to engage the reference hollow 73, 73' when the latter is in a preset position (which faces the pivot 74 in the preferred and illustrated embodiment).

In greater detail, the detection arm 72 is pivoted, at a first end, to a surface of the table 3 and, at a second end, is connected to a return element 75 (such as for example an elastic element, such as a spring), which pulls the arm 72 in rotation toward the annular body 71, thus pushing the pivot 74 to engage the reference hollow 73 when it is aligned with said pivot 74.

Proximate to the second end of the detection arm 72 there is a switch 77 or a sensor (such as for example an inductive or capacitive sensor) which, by detecting the position of the detection arm 72, indirectly detects that indexing has occurred (i.e., that the collet assembly 41 has been fixed in the predetermined position).

The indexing device is particularly useful for drilling and milling work and therefore is preferably adopted in transfer machines intended for this type of machining.

As is obvious, the transfer machine 1 preferably also comprises a driving assembly and a transmission system for the rotation of the table 3, as well as control electronics; these elements are per se known and therefore are not described in further detail.

The operation of the improved transfer machine is clear and evident from what has been described.

In practice it has been found that the improved transfer machine according to the present disclosure achieves the intended aim and advantages, since it allows to have available a solution that allows the mounting of motors of any size and power without the dimensions and/or the space occupations of the table being affected.

Another advantage of the transfer machine according to the disclosure resides in that it is less sensitive to dirt and/or fragments caused by machining.

A further advantage of the transfer machine according to the disclosure resides in that it provides an alternative to known solutions.

Another advantage of the transfer machine according to the disclosure resides in that it has a facilitated maintenance.

The improved transfer machine thus conceived is susceptible of numerous modifications and variations, all of which are within the scope of the inventive concept.

In practice, the materials used, so long as they are compatible with the specific use, as well as the contingent shapes and dimensions, may be any according to the requirements.

The invention claimed is:

1. A transfer machine comprising:
   a frame,
   a table which is supported on the frame and is configured to rotate with respect to the frame about a main vertical axis,
   a plurality of work holding assemblies mounted on the table, each work holding assembly being provided with at least one collet assembly for retaining a workpiece being machined, said collet assembly being able to rotate with respect to the table about a vertical workpiece rotation axis,
   at least one actuation motor in order to actuate rotationally said collet assembly and provided with a driving shaft which can rotate about a respective driving axis,
   at least one transmission assembly, configured to be activated selectively and is configured to transmit motion from said driving shaft to said collet assembly, wherein
   said at least one actuation motor is integral with the frame of the machine, with the respective driving shaft arranged horizontally,
   further comprising a support which is movably coupled to the frame, said support being movable along a rectilinear trajectory, the motor being integral with the support, at least the motor and the driving shaft being movable in a linear manner between a first condition in which the transmission assembly is activated, in which the collet assembly is functionally coupled to the driving shaft, and a second condition in which the transmission assembly is deactivated, in which the collet assembly is functionally uncoupled from the driving shaft; the machine furthermore comprises an actuator which is coupled to the frame and to the movable support in order to actuate the rectilinear movement of the latter with respect to the frame, the movement trajectory of the support lying on a horizontal plane which is perpendicular with respect to the main vertical axis.

2. The machine according to claim 1, wherein said collet assemblies define a work radius of the machine, said at least one actuation motor being mounted externally to said work radius.

3. The machine according to claim 1, wherein the transmission assembly comprises a first bevel gear with vertical axis and a second bevel gear with horizontal axis, which mesh together, and wherein the first gear is integral with the collet assembly and the second gear is integral with an engagement shaft configured to be coupled to the driving shaft.

4. The machine according to claim 1, wherein the engagement shaft is coaxial to the driving shaft, the engagement shaft and the driving shaft comprise toothed engagement ends which are configured to mesh in the activated transmission assembly condition.

5. The machine according to claim 1, wherein the transmission assembly comprises a gear and a worm screw which are coupled rotationally to said collet assembly, the worm screw being provided with a horizontal screw shaft, said screw shaft being configured to be coupled to the driving shaft.

6. The machine according to claim 1, wherein the screw shaft is coaxial to the driving shaft, the screw shaft and the driving shaft comprising facing toothed engagement ends which are configured to mesh in the activated transmission assembly condition.

7. The machine according to claim 1, comprising an indexing device which acts between the collet assembly and the work holding table configured to provide an indexing of the collet assembly.

* * * * *